United States Patent [19]
Black et al.

[11] Patent Number: 5,195,269
[45] Date of Patent: Mar. 23, 1993

[54] FLY TYING FILM

[76] Inventors: William J. Black, 2151 Whistlers Park La.; Kenneth A. Ferguson, 2195 W. Military Ave., both of Roseburg, Oreg. 97470

[21] Appl. No.: 739,909

[22] Filed: Aug. 2, 1991

[51] Int. Cl.$^5$ .............................................. A01K 85/00
[52] U.S. Cl. .................................... 43/42.25; 43/42.53
[58] Field of Search ............................. 43/42.25, 42.53

[56] References Cited

U.S. PATENT DOCUMENTS

| | | | |
|---|---|---|---|
| 1,657,734 | 1/1928 | Wright | 43/42.25 |
| 2,114,342 | 4/1938 | Gardner | 43/42.25 |
| 2,209,096 | 7/1940 | Sherer | 43/42.25 |
| 2,350,572 | 6/1944 | Schwergert | 43/42.25 |
| 2,511,117 | 6/1950 | Loeb | 43/42.25 |
| 2,757,476 | 8/1956 | Pender | 43/42.53 |
| 3,072,973 | 1/1963 | Barnette | 43/42.53 |
| 3,180,049 | 4/1965 | Gunderson | 43/42.53 |
| 5,068,997 | 12/1991 | Shimazaki | 43/42.25 |

Primary Examiner—Kurt C. Rowan

[57] ABSTRACT

A fly tying film constructed by the lamination, coloring, and stretching of sheets of low-density polyethylene plastic stretch wrap film. Layers of the stretch wrap film are pressed together either, with or without paint sprayed between them. The combined layers are then stretched just short of the failure point. This stretching work-hardens the fly tying film and eliminates the resilient characteristics of the unprocessed stretch wrap. Pieces of the fly tying film are secured to a fishing hook in combination with other materials to build an artificial fishing fly for use in the sport angling pursuit of game fish. Pieces of the fly tying film can be pre-cut to the required shape or it may be formed and trimmed to the desired appearance as part of the fly tying process.

10 Claims, 1 Drawing Sheet

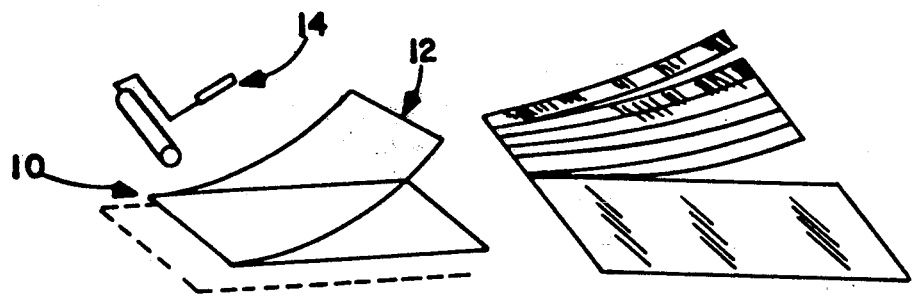
Fig. 1  Fig. 2
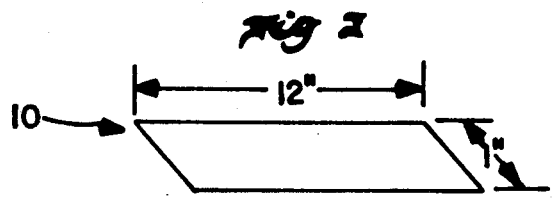
Fig. 3
Fig. 4
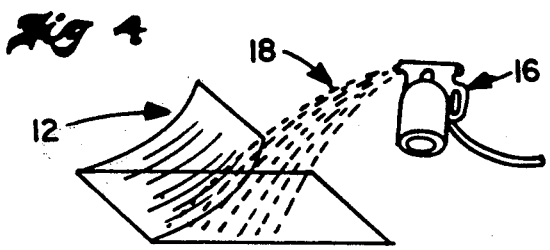
Fig. 5
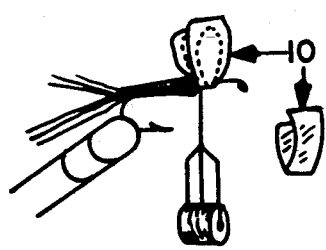 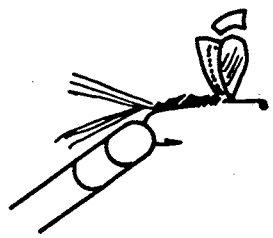 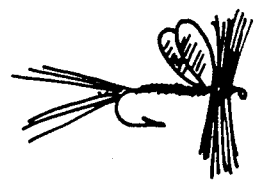
Fig. 6  Fig. 7  Fig. 8
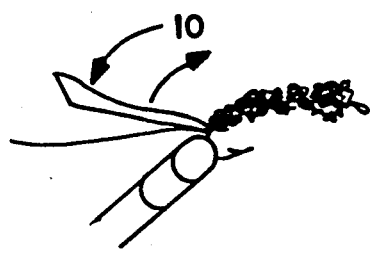 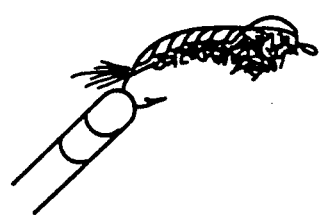
Fig. 9  Fig. 10

FLY TYING FILM

FIELD OF THE INVENTION

This disclosure relates to the manufacture of a multi-layered, colored plastic film used to represent various insect body parts in the construction of artificial fishing lures such as flies.

SUMMARY OF THE INVENTION

Certain artificial fishing fly patterns benefit from the representation of an insect wing or other body part best imitated by a thin, nonporous film. This invention creates a plastic film especially suited for use as wings on a fishing fly. It can also be used to simulate the exoskeletons of fresh-water shrimp and scruds, larva cases, and pre-emergent wings on insect pupas.

While wings on small, adult flying insects are quite similar in thickness and texture, they vary widely in shape and color. The plastic fly tying film created by this invention is colored during the manufacturing process to any tone and pattern required.

The fly tying film created by this invention is easily handled during the fly tying procedure and may be cut to any shape desired.

These features are provided in the present invention by a method of making a fly-tying film. First and second sheets of low-density polyethylene film are provided. This film is characterized as being resilient when stretched with a predetermined tension and being non-resilient when stretched with a tension greater than the predetermined tension and less than a yield tension. A face of the first sheet is adhered to a face of the second sheet. The combined first and second sheets are then work hardened by stretching the adhered first and second sheets with a tension greater than the predetermined tension and less than the yield tension.

In the preferred method of the invention several sheets are adhered together. A lacquer-based paint is sprayed on one of two faces of the sheets to be adhered together to create a speckled appearance. This can be done to any of the faces to be adhered to a face of another sheet. The layers are then pressed together and stretched while the pant is still is liquid form. The stretching creates a desirable ripple-like texture to the resulting film, and the stretching of the paint spots creates elongated colored streaks that are representative of natural coloring.

These and other features and advantages of the present description of the preferred embodiment of the invention, are described for purposes of illustration but not limitation, and as illustrated in the accompanying drawings.

DESCRIPTION OF THE PRIOR ART

Many attempts have been made to utilize plastics, both sheet material and in molded forms, in the construction of fishing flies. One common product is pre-cut wings die-stamped from a single layer of plastic film. These may be clear, colored by dye or conventional felt-tip marking pens, or have a printed or stamped on pattern. Other wings have been made from a variety of synthetic fabrics with color and patterns applied in many forms and patterns.

The product most similar in appearance to our invention, that we are aware of was created by an angler residing in Japan in 1988 for his private use. This material consisted of two sheets of plastic film which were altered in ways including coloring, wrinkling, applying printed patterns, and overlaying with glitter. The two sheets are then bonded with an adhesive and wings were cut from the resulting material. Commercial production of this product proved impractical. The limited number of flies utilizing it were produced, primarily as conversation pieces.

Molded plastic forms have been used to replicate everything from individual fly components to molding an entire insect form in one piece. Color and texture are either incorporated in the molding process or are added later.

BACKGROUND OF THE INVENTION

Artificial lures for use with conventional fly casting tackle in the sporting pursuit of game fish have been ties for centuries. Prior to World War II, almost all of the construction materials, with the exception of the hook, were of natural origin such as deer hair, rabbit fur, duck feathers, silk thread, etc.

Synthetic materials have been desirable to use from the standpoint of cost and supply availability. A major problem with synthetic materials has been its lack of ability to mimic the delicate textures and colorings of the natural foods of game fish. This invention is directed to a plastic film, and method of making it, which can be used to construct many different parts of a wide variety of fish fly patterns. It is also designed to be durable in use and practical and efficient to incorporate into the manufacture of fishing flies.

The present invention is found to be particularly useful for the manufacture of artificial flies. It may, however, also be used on lures which may not specifically represent flies.

BRIEF DESCRIPTION OF THE DRAWINGS

FIG. 1 is a sketch showing the separate layers of plastic film being laminated.

FIG. 2 is a sketch showing individual strips being cut from the laminated base material.

FIG. 3 is a sketch showing typical dimensions of an individual strip of laminated material prior to stretching.

FIG. 4 is a sketch showing typical dimensions of a single strip of laminated material after the stretching process.

FIG. 5 is a sketch showing the application of paint between layers of plastic film during the lamination process.

FIG. 6, FIG. 7, and FIG. 8 show the steps to incorporate the fly tying film as a wing on a typical dry fly pattern.

FIG. 9 and FIG. 10 show the fly tying film being used to represent a shellback and wingcase on a typical nymph pattern.

A PREFERRED METHOD OF PRACTICING THE INVENTION

The base material for the construction of a fly tying film made according to this invention is the single layer plastic film intended to be used to wrap around items to contain and control them for packaging and shipping. It is available in rolls of several widths and thicknesses. The film may be clear or tinted black, blue, red, or green. This invention has been made from thicknesses of 60 gauge, 80 gauge, and 135 gauge. Heavier material will be used when it becomes available.

The base material is conventionally known as "stretch wrap" or "stretch film". This film when stretched has an elastic deformation range of approximately 5% to 10% when pulled lengthwise. Continued stretching puts the "stretch wrap" film into the plastic deformation range. Elongation in the plastic deformation range is 300% to 600%. At the limit of the plastic deformation range, an increase in tensile strength occurs. Increasing pulling tension at this point will result in failure of the elongated strip of material.

Referring to FIGS. 1-5, the fly tying film, shown generally at 10 in the drawings, in manufactured by layering two or more sheets 12 of stretch wrap film together, as shown in FIG. 1. The layered sheets are pressed together by rolling with a conventional paint roller 14. The layers are self adhering with this process.

The layered material is then cut into strips as illustrated in FIG. 1. The strips, typically one inch wide, are then cut into a convenient length, such as 12 inches, as shown in FIG. 3. As described above, the strip is then stretched by hand until the end of the plastic deformation range is reached as shown in FIG. 4. This limit can be sensed by the failure of the material to elongate under continued tension.

During the stretching procedure, the laminated strips are narrowed by 50%. Therefore, if a finished product of ½ inch is required, strips prior to stretching, 1 inch wide strips will be cut.

The fly tying film needed for an uncolored, transparent wing material for a pattern like the "Flying Ant" is manufactured by the three steps illustrated in FIGS. 1-4. The first step is the direct layering of one sheet of stretch wrap film onto a second sheet of stretch wrap film. A brush or roller may be used to press the two sheets together insuring complete surface to surface contact. The last step is to stretch the strips to the end of the plastic deformation range. The fly tying film will be cut to the shape of flying ant wings during the actual tying of the fishing flies, as illustrated in FIGS. 65-8.

The manufacturing process required to construct the fly tying film created by this invention provides the opportunity to incorporate color in an endless variety of colors and in a pattern form particularly suited for use in fly patterns designed for sport angling for game fish. As is shown in FIG. 5, coloring the fly tying film is done by spray painting one of the plastic film sheets to the desired color and pattern, such as with a conventional sprayer 16, while the paint is still wet, immediately overlaying the next sheet, and following the steps described in FIGS. 1-4. This produces a coloring pattern of elongated oval shapes which replicate the natural coloring patterns found on many flying insect wings. Up to five layers of stretch wrap film and 4 layers of paint in various colors and applications are used to construct the fly tying film in different thicknesses and visual patterns to meet the requirements of the fishing fly patterns to be tied.

The color and patterns are protected from chipping, fading or peeling during the lift of the fishing fly by having the coloring agent laminated between two or more sheets of plastic film.

The coloring agent used most often is lacquer-based spray paint which is applied by spraying coats of incomplete coverage leaving a splattered pattern of distinct individual droplets on one sheet of the stretch wrap film. Metal flake and aluminized paint create shiny, sparkling specialized effects. Light, misted coverage of lacquer-based paint will produce an overall tinting effect. Conventional felt-tipped marking pens are used to produce transparent tints in numerous colors.

It has been found that the solvents in the liquid paint chemically react with the film to slightly soften the surface of the stretch wrap film. When the lamination and stretching process is completed before the paint dries, this solvent-induced softening effect enhances the self-bonding characteristics of the stretch wrap film.

Pulling the stretch wrap film through the range of plastic deformation right up to, but not through its yield point, produces the characteristics of texture and appearance which enable this invention to successfully imitate the wings and other body parts of insects.

Pulling the stretch wrap film to the end of its plastic deformation range work-hardness the film. The workhardening imparts characteristics vital to this invention's suitability for use in the construction of artificial fishing flies. Unprocessed plastic film is difficult to cut to precise dimensions with scissors. The method of this invention creates a product which is easily handled and trimmed to exact dimensions.

Also unprocessed plastic films are easily cut by the tension of the small diameter threads used during construction of the flies. The fly tying film 10 made according to this invention, easily withstands the pressure applied by the thread and wire used in the tying of flies. Unprocessed plastic film shrinks, cups, and curls when exposed to sunlight and temperature changes, whereas the fly tying film 10 retains its original appearance and texture throughout the wet dry cycles and temperature changes that fishing flies are subjected to during field use.

There may be other materials that can be used to produce the present invention, and even some that require use of a separate adhesive. Further, color could be obtained by using film that is colored during manufacture or colored prior to assembly. The foregoing descriptions are therefore intended for purposes of illustration and not limitation. Other variations in the materials and methods may thus be made without varying from the spirit and scope of the invention as described in the claims.

We claim:

1. A method of making a fly-tying film for use as body parts of an artificial fishing fly comprising the steps of:
   providing first and second sheets of low-density polyethylene film characterized as being resilient when stretched with a predetermined tension and being nonresilient when stretched with a tension greater than the predetermined tension and less than a yield tension;
   adhering a face of the first sheet to a face of the second sheet;
   workhardening the adhered first and second sheets by stretching the adhered first and second sheets with a tension greater than the predetermined tension and less than the yield tension.

2. A method according to claim 1 further comprising, prior to the step of workhardening, applying color to at least one of the first and second sheets in isolated spots.

3. A method according to claim 2 wherein the the color is applied as a liquid that reacts chemically to soften the face of the first sheet.

4. A method according to claim 2 wherein the color is applied as a liquid and the step of workhardening occurs before the liquid dries on the first sheet.

5. A method according to claim 1 wherein the step of adhering includes applying a liquid that reacts chemically to soften the first sheet, and the step of workhardening is performed before the liquid dries.

6. A method according to claim 5 wherein the step of applying a liquid includes applying the liquid in isolated spots on the first sheet.

7. A method according to claim 6 wherein the liquid is tinted with a color.

8. A method according to claim 1 wherein the film is further characterized as being self-adhering and the step of adhering includes pressing the two sheets together.

9. A method according to claim 8 step of pressing includes the steps of placing one of the sheets on a smooth surface, placing the other of the sheets on the sheet placed on the smooth surface, and applying pressure on the other sheet.

10. An artificial fly for use in fishing comprising:
 a hook having a shank; and
 a non-resilient polyethylene film formed of at least a pair of low-density, polyethylene sheets adhered together and stretched beyond the plastic range of deformation, attached fixedly to the hook with a portion exposed and shaped in the form of a body part of an insect.

* * * * *